United States Patent Office 3,832,361
Patented Aug. 27, 1974

3,832,361
AZIDES
Clive A. Henrick and John B. Siddall, Palo Alto, Calif., assignors to Zoecon Corporation, Palo Alto, Calif.
No Drawing. Original application Feb. 16, 1971, Ser. No. 115,725. Divided and this application Aug. 18, 1972, Ser. No. 281,898
Int. Cl. C07d 109/00
U.S. Cl. 260—349                                    4 Claims

ABSTRACT OF THE DISCLOSURE

Polyunsaturated aliphatic hydrocarbon thiolesters, nitriles, amines, halides, alcohols and derivatives thereof, synthesis thereof, for the control of arthropods.

---

This is a division of application Ser. No. 115,725, filed Feb. 16, 1971.

This invention relates to novel polyunsaturated aliphatic compounds, novel intermediates therefor, syntheses thereof and to the control of arthropods. The novel polyunsaturated aliphatic compounds are represented by the following formula A:

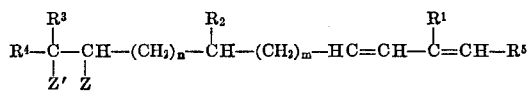

(A)

wherein, m is zero or the positive integer one, two or three;
n is the positive integer one, two or three;
Z is hydrogen, bromo, chloro, fluoro or hydroxy;
Z' is bromo, chloro, fluoro, —OR⁶, or taken together with Z, oxido, epithio, imino or carbon-carbon bond;
R¹ is hydrogen or alkyl;
each of R², R³ and R⁴ is alkyl;
R⁵ is one of the groups —C≡N, —CH₂—X,
   —CH₂—OR⁷, —CH₂—SR⁷,

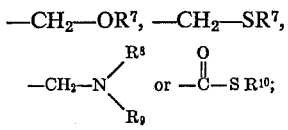

R⁶ is hydrogen, carboxylic acyl, alkyl, cycloalkyl, aralkyl or aryl; R⁷ is hydrogen, alkyl, cycloalkyl, aralkyl or aryl; X is bromo or chloro;
each of R⁸ and R⁹ is hydrogen, alkyl, alkenyl, cycloalkyl, hydroxyalkyl, alkoxyalkyl, phenyl, or, when taken together with the nitrogen atom to which they are attached, pyrrolidino, morpholino, piperidino, piperazino or 4-alkylpiperazino; and R¹⁰ is alkyl.

The compounds of formula A are useful for the control of Arthropods, particularly insects. The compounds are applied using suitable carrier substances, such as either liquid or solid carriers, such as water, acetone, cottonseed oil, xylene, mineral oil, silica, talc, natural and synthetic resins, and the like. Generally, compositions for application will contain up to about 75% of the active compound and more usually less than 25%, sufficient composition should be applied to provide from about 0.1 to 25 micrograms of the active compound per insect. Typical insects controlled by the present invention are Diptera, such as mosquitos and houseflies; Hemiptera, such as Pyrrhocoridae and Miridae; Lepidopteran, such as Pyralidae, Noctuidae and Gelechiidae; and Coleoptera, such as Tenebrionidae, Chrysomelidae and Dermestidae. For example, *Pyrrhocoris apterus*, *Lygus hesperus*, Aphids, *Tenebrio molitor*, *Triboleum confusm*, *Diabrotica duodecimpunctata*, *Dermestes maculatus*, Alfalfa weevil, Potatoe tubermoth, *Aedes aegypti* and *Musca domestica*. Without any intention of being bound by theory, the compounds of formula A are believed to be effective by reason of hormonal action in that unlike conventional insecticides which are effective by reason of causing immediate death, the compounds of formula A are effective by reason of physiological changes caused in the treated insect which result in eventual death of the insect and/or inability of the treated insect to reproduce by reason of sterility or abnormal development.

In the description hereinafter, each of R¹ through R¹⁰, X, Z, Z', m and n is as defined hereinabove.

The compounds of the present invention are prepared according to the following outlined syntheses:

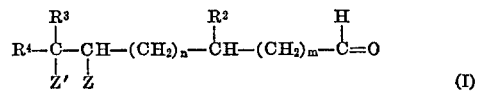

(I)

↓

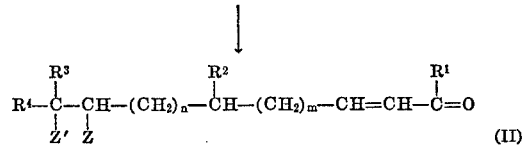

(II)

↓ (A; R⁵ is —C≡N)

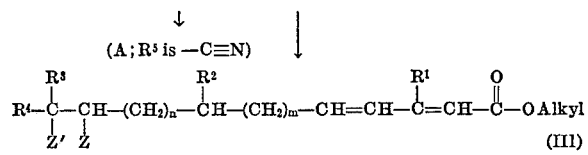

(III)

↓ (A; R⁵ is —CH₂—OH)

In the above outlined process, an aldehyde of formula I is reacted with a carbanion of formula IA or by Wittig reaction using an ylid of formula IB to produce a compound of formula II (R is cycloalkyl or phenyl).

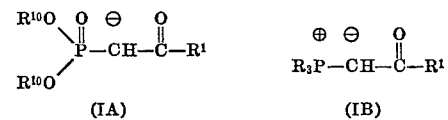

(IA)                        (IB)

A compound of formula II is reacted with a dialkyl phosphonoacetonitrile in the presence of base, such as an alkali metal hydride or alkali metal alkoxide, in an organic solvent, such as a hydrocarbon, ether or dialkylsulfoxide, e.g., tetrahydrofuran, benzene, dimethylsulfoxide, toluene, dimethylformamide, and the like, to prepare the novel nitriles of formula A.

The esters of formula III are prepared by the reaction of a compound of formula II with carbanion of dialkyl carbalkoxymethylphosphonate as described in our copending application Ser. No. 111,766, filed Feb. 1, 1971, now abandoned, the disclosure of which is incorporated by reference. Reduction of an ester of formula III using lithium aluminum hydride, or the like, affords the allylic alcohols of formula A (R⁵ is —CH₂—OR⁷ in which R⁷ is hydrogen).

The thiolesters of formula A

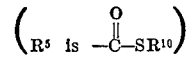

are prepared from the acid chloride by reaction with alkylmercaptan or alkyl lead mercaptide.

The novel epoxides of formula A (Z' taken together with Z is oxido) are prepared by reacting a tri-unsaturated compound of formula A (Z' taken together with Z is a carbon-carbon bond) with an organic peracid, such as perphthalic acid or perbenzoic acid, in an organic solvent.

The novel aziridines of formula A (Z' taken together with Z is imino) are prepared as follows:

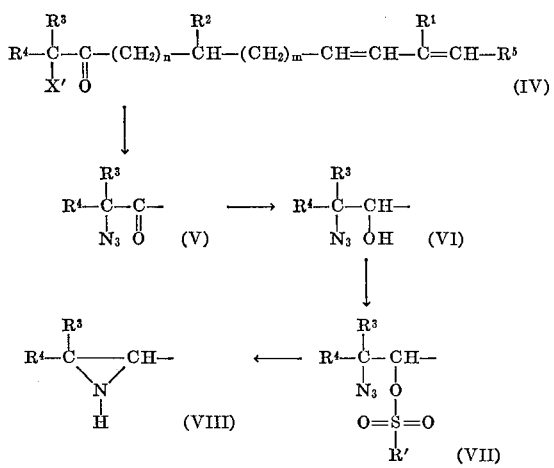

In the above formulas X' is bromo or chloro and R' is methyl or tolyl.

In the practice of the above process, a haloketone of formula IV is reacted with an alkali azide, such as sodium azide, in an organic solvent, such as dimethylformamide, dimethylacetamide, and the like, at room temperature or above to afford the 11-azido compound (V). The azidoketone (V) is then reduced using sodium borohydride or other reducing agent to yield the corresponding 10-hydroxy-11-azido of formula VI. A compound of formula VI is treated with tosyl or mesylchloride in triethylamine, pyridine, or the like, to form the sulfone (VII). A compound of formula VII is then reduced using a reducing agent formed of sodium borohydride and a transition metal, such as a lower valance cobaltous halide. The reducing agent can be formed in the presence or absence of dipyridyl. The reduction and formation of the reducing agent can be carried out in an organic solvent, such as ethanol, methanol, tetrahydrofuran, and other high boiling ethers.

The haloketones (IV) are prepared from the corresponding halohydrin (A; Z' is bromo or chloro and Z is hydroxy) by oxidation using Jones reagent or chromium trioxide/pyridine. The halohydrin is prepared by treatment of an epoxide of formula A with HCl or HBr in the presence of water which affords 11-hydroxy-10-halo, as well, which can be separated by chromatography.

Another embodiment of the present invention is the aziridines of the alkyl ester (III) which can be prepared by the aforementioned procedure. These compounds are used for the control of insects in the same way as the compounds of formula A.

As alternative syntheses embraced in the outlined syntheses above, a mono-unsaturated aldehyde of formula I (Z' taken together with Z is a carbon-carbon bond) can first be elaborated using the methods described above and thereafter converted into the carbonyl of formula II which is then converted into the compounds of formula A.

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. Whenever any of the foregoing terms are modified by the word "lower," the chain length of the group is not more than six carbon atoms.

The following examples are provided to illustrate the present invention. Temperature is given in degrees Centigrade.

EXAMPLE 1

To a solution of 25.4 g. of 3,7,11-trimethyldodeca-2,4,10-trienoyl chloride in ether is added 12.4 g. of ethylmercaptan and 11.8 g. of pyridine at −40°. The mixture is allowed to stand at 0° for about three hours and then is diluted with ether and water and separated. The ether phase is washed with dilute aqueous sodium hydroxide, dilute hydrochloric acid and then water, dried and solvent removed to yield ethyl 3,7,11-trimethyl-thioldodeca-2,4,10-trienoate.

The process of this example is repeated using each of the acid chlorides under column VII to prepare the respective thiol ester under column VIII.

VII 3,7,11-trimethyltrideca-2,4,10-trienoyl chloride
3,11-dimethyl-7-ethyltrideca-2,4,10-trienoyl chloride
7,11-diethyl-3-methyltrideca-2,4,10-trienoyl chloride
3,8,12-trimethyltrideca-2,4,11-trienoyl chloride
3,7,10-trimethylundeca-2,4,9-trienoyl chloride
3,7,10-trimethyldodeca-2,4,9-trienoyl chloride
3,6,10-trimethylundeca-2,4,9-trienoyl chloride
7,11-dimethyldodeca-2,4,10-trienoyl chloride
7,11-dimethyltrideca-2,4,10-trienoyl chloride
7-ethyl-11-methyltrideca-2,4,10-trienoyl chloride
7,11-diethyltrideca-2,4,10-trienoyl chloride
8,12-dimethyltrideca-2,4,11-trienoyl chloride
7,10-dimethylundeca-2,4,9-trienoyl chloride
7,10-dimethyldodeca-2,4,9-trienoyl chloride
6,10-dimethylundeca-2,4,9-trienoyl chloride

VIII ethyl 3,7,11-trimethyl-thioltrideca-2,4,10-trienoate
ethyl 3,11-dimethyl-7-ethyl-thioltrideca-2,4,10-trienoate
ethyl 7,11-diethyl-3-methyl-thioltrideca-2,4,10-trienoate
ethyl 3,8,12-trimethyl-thioltrideca-2,4,11-trienoate
ethyl 3,7,10-trimethyl-thiolundeca-2,4,9-trienoate
ethyl 3,7,10-trimethyl-thioldodeca-2,4,9-trienoate
ethyl 3,6,10-trimethyl-thiolundeca-2,4,9-trienoate
ethyl 7,11-dimethyl-thioldodeca-2,4,10-trienoate
ethyl 7,11-dimethyl-thioltrideca-2,4,10-trienoate
ethyl 11-methyl-7-ethyl-thioltrideca-2,4,10-trienoate
ethyl 7,11-diethyl-thioltrideca-2,4,10-trienoate
ethyl 8,12-dimethyl-thioltrideca-2,4,11-trienoate
ethyl 7,10-dimethyl-thiolundeca-2,4,9-trienoate
ethyl 7,10-dimethyl-thioldodeca-2,4,9-trienoate
ethyl 6,10-dimethyl-thiolundeca-2,4,9-trienoate Methylmercaptan is reacted with each of the trienoylchlorides above using the procedure of this example except that the reaction mixture is prepared to about −10° and the reaction is carried out in a sealed vessel to prepare the respective methyl thiol esters, e.g.—methyl 3,7,11-trimethyl-thioldodeca-2,4,10-trienoate, methyl 3,7,11-trimethyl-thioltrideca - 2,4,10 - trienoate, methyl 3,11-dimethyl-7-ethyl-thioltrideca-2,4,10-trienoate, etc.

EXAMPLE 2

3,7,11-trimethyltrideca-2,4,10-trienoyl chloride (18 g.) is added slowly to ethyl lead mercaptide (13.4 g.) covered with ether. The mixture is allowed to stand overnight and then is filtered. The filtrate is evaporated under reduced pressure to yield ethyl 3,7,11-trimethyl-thioltrideca-2,4,10-trienoate which can be purified by chromatography.

EXAMPLE 3

To a mixture of 24 g. of ethyl 3,7,11-trimethyl-thioldodeca-2,4,10-trienoate in 75 ml. of ether, cooled in an ice-bath, is slowly added 0.1 mole of perphthalic acid in ether. Then the reaction mixture is allowed to stand for about 30 minutes. The mixture, at room temperature, is shaken with dilute aqueous sodium hydroxide and then separated. The organic phase is washed with water, dried over magnesium sulfate and evaporated under reduced pressure to yield ethyl 10,11-oxido-3,7,11-trimethylthioldodeca-2,4-dienoate, which is purified by chromatography on neutral silica gel.

The above process is repeated using each of the unsaturated esters under column VIII to prepare the respective epoxide under column IX.

IX ethyl 10,11-oxido-3,7,11-trimethyl-thioltrideca-2,4-dienoate
ethyl 10,11-oxido-3,11-dimethyl-7-ethyl-thioltrideca-2,4-dienoate
ethyl 10,11-oxido-7,11-diethyl-3-methyl-thioltrideca-2,4-dienoate
ethyl 11,12-oxido-3,8,12-trimethyl-thioltrideca-2,4-dienoate
ethyl 9,10-oxido-3,7,10-trimethyl-thioltrideca-2,4-dienoate
ethyl 9,10-oxido-3,7,10-trimethyl-thioldodeca-2,4-dienoate
ethyl 9,10-oxido-3,6,10-trimethyl-thiolundeca-2,4-dienoate
ethyl 10,11-oxido-7,11-dimethyl-thioldodeca-2,4-dienoate
ethyl 10,11-oxido-7,11-dimethyl-thioltrideca-2,4-dienoate
ethyl 10,11-oxido-11-methyl-7-ethyl-thioltrideca-2,4-dienoate
ethyl 10,11-oxido-7,11-diethyl-thioltrideca-2,4-dienoate
ethyl 11,12-oxido-8,12-dimethyl-thioltrideca-2,4-dienoate
ethyl 9,10-oxido-7,10-dimethyl-thiolundeca-2,4-dienoate
ethyl 9,10-oxido-7,10-dimethyl-thioldodeca-2,4-dienoate
ethyl 9,10-oxido-6,10-dimethyl-thiolundeca-2,4-dienoate

EXAMPLE 4

Part A—Into a mixture of 2 g. of ethyl 10,11-oxido-3,7,11-trimethyldodeca-2,4-dienoate in 150 ml. of ether, there is slowly introduced one equivalent of hydrogen chloride at 0°. The mixture is allowed to stand for about 12 hours. Then the mixture is washed with 5% aqueous sodium bicarbonate solution, dried over sodium sulfate and evaporated to yield a mixture of ethyl 11-chloro-10-hydroxy-3,7,11-trimethyldodeca-2,4-dienoate and ethyl 11-hydroxy-10-chloro - 3,7,11 - trimethyldodeca-2,4-dienoate which are separated by chromatography.

By using hydrogen bromide in place of hydrogen chloride, there is prepared ethyl 11-bromo-10-hydroxy-3,7,11-trimethyldodeca-2,4-dienoate and ethyl 11-hydroxy-10-bromo-3,7,11-trimethyldodeca-2,4-dienoate.

Part B—To a stirred solution of 1 g. of ethyl 11-chloro-10-hydroxy-3,7,11-trimethyldodeca-2,4-dienoate in 10 ml. of acetone, cooled to 0°, is added under nitrogen, a solution of 8N chromic acid (prepared by mixing chromium troxide, conc. sulfuric acid and water) until the color of the reagent persists in the mixture. The mixture is then stirred for one minute at 0–5° and diluted with water. The product is extracted with ether, washed with water and dried to yield ethyl 11-chloro-10-oxo-3,7,11-trimethyldodeca-2,4-dienoate.

Part C—To 1 g. of ethyl 11-chloro-10-oxo-3,7,11-trimethyldodeca-2,4-dienoate in 2.0 ml. of dimethylformamide is added 26 mg. of sodium azide and the temperature brought to 85°. After about 3.5 hours, the reaction is cooled to room temperature. The reaction is diluted with pentane and water, separated and the aqueous phase extracted with pentane/ether. The combined organic phases are washed with saturated sodium chloride solution, dried over magnesium sulfate and solvent evaporated to yield ethyl 11-azido-10-oxo-3,7,11-trimethyldodeca-2,4-dienoate.

Part D—To 0.9 g. of the above prepared azido ketone in 2.0 ml. of anhydrous methanol is added about 4 mg. of sodium borohydride. After about one hour, water and ether is added and the layers separated. The aqueous layer is extracted with ether and combined with the organic layer which is washed to neutrality using saturated sodium chloride. The organic phase is then dried over magnesium sulfate and solvent removed to yield ethyl 11-azido-10-hydroxy - 3,7,11 - trimethyldodeca-2,4-dienoate. Using silica gel, the diasteromeric azide alcohols can be resolved, if desired.

Part E—A solution of 80 mg. of crude ethyl 11-azido-10-hydroxy - 3,7,11 - trimethyldodeca-2,4-dienoate and 10 ml. of a 0.3M triethylamine in pentane is cooled to −5°. Then 200 mg. of mesyl chloride is added. After 45 minutes, the reaction is poured onto ice and ether is added. The organic phase is washed with dilute HCl, saturated sodium bicarbonate, saturated sodium chloride and then dried over sodium sulfate and solvent removed to yield the corresponding 10-mesylate.

Part F—Anhydrous $CoBr_2$ (146 mg.) is dissolved in 10 ml. of absolute ethanol and then 312 mg. of dipyridyl is added followed by 76 mg. of sodium borohydride at 0° under argon.

To 35 mg. of the above prepared 10-mesylate in 0.8 ml. of ethanol at 0°, under argon, is added 0.20 ml. of the above prepared reducing solution and after several minutes an additional 0.5 ml. of the reducing solution is added. After 0.5 hour, the reaction is poured into water and ether added. The organic phase is washed with saturated sodium chloride solution, dried over magnesium sulfate and solvent removed to yield ethyl 10,11-imino-3,7,11-trimethyldodeca-2,4-dienoate which can be purified by chromatography.

EXAMPLE 5

Following the processes of parts A and B of Example 4, each of the epoxides under column XIII is converted into the respective halohydrins, the chloro-hydroxy derivative separated and oxidized to prepare the respective chloroketone under column XIV.

XIII ethyl 10,11-oxido-3,7,11-trimethyltrideca-2,4-dienoate
ethyl 10,11-oxido-3,11-dimethyl-7-ethyltrideca-2,4-dienoate
ethyl 10,11-oxido-7,11-diethyl-3-methyltrideca-2,4-dienoate
ethyl 11,12-oxido-3,8,12-trimethyltrideca-2,4-dienoate
ethyl 9,10-oxido-3,7,10-trimethylundeca-2,4-dienoate
ethyl 9,10-oxido-3,7,10-trimethyldodeca-2,4-dienoate
ethyl 9,10-oxido-3,6,10-trimethylundeca-2,4-dienoate
ethyl 10,11-oxido-7,11-dimethyldodeca-2,4-dienoate
ethyl 10,11-oxido-7,11-dimethyltrideca-2,4-dienoate
ethyl 10,11-oxido-11-methyl-7-ethyltrideca-2,4-dienoate
ethyl 10,11-oxido-7,11-diethyltrideca-2,4-dienoate
ethyl 11,12-oxido-8,12-dimethyltrideca-2,4-dienoate
ethyl 9,10-oxido-7,10-dimethylundeca-2,4-dienoate
ethyl 9,10-oxido-7,10-dimethyldodeca-2,4-dienoate
ethyl 9,10-oxido-6,10-dimethylundeca-2,4-dienoate

XIV ethyl 11-chloro-10-oxo-3,7,11-trimethyltrideca-2,4-dienoate
ethyl 11-chloro-10-oxo-3,11-dimethyl-7-ethyltrideca-2,4-dienoate
ethyl 11-chloro-10-oxo-7,11-diethyl-3-methyltrideca-2,4-dienoate
ethyl 12-chloro-10-oxo-3,8,12-trimethyltrideca-2,4-dienoate
ethyl 10-chloro-9-oxo-3,7,10-trimethylundeca-2,4-dienoate
ethyl 10-chloro-9-oxo-3,7,10-trimethyldodeca-2,4-dienoate
ethyl 10-chloro-9-oxo-3,6,10-trimethylundeca-2,4-dienoate ethyl 11-chloro-10-oxo-7,11-dimethyldodeca-2,4-dienoate
ethyl 11-chloro-10-oxo-7,11-dimethyltrideca-2,4-dienoate
ethyl 11-chloro-10-oxo-11-methyl-7-ethyltrideca-2,4-dienoate
ethyl 11-chloro-10-oxo-7,11-diethyltrideca-2,4-dienoate
ethyl 12-chloro-11-oxo-8,12-dimethyltrideca-2,4-dienoate
ethyl 10-chloro-9-oxo-7,10-dimethylundeca-2,4-dienoate
ethyl 10-chloro-9-oxo-7,10-dimethyldodeca-2,4-dienoate
ethyl 10-chloro-9-oxo-6,10-dimethylundeca-2,4-dienoate

EXAMPLE 6

Following the processes of parts C, D, E and F of Example 4, successively, using the chloroketones under column XIV as the starting material, there is prepared the respective azido-ketone, azido-hydroxy compound and azido-mesylate which is converted into the respective aziridine under column XV.

XV ethyl 10,11-imino-3,7,11-trimethyltrideca-2,4-dienoate
ethyl 10,11-imino-3,11-dimethyl-7-ethyltrideca-2,4-dienoate
ethyl 10,11-imino-7,11-diethyl-3-methyltrideca-2,4-dienoate
ethyl 11,12-imino-3,8,12-trimethyltrideca-2,4-dienoate
ethyl 9,10-imino-3,7,10-trimethylundeca-2,4-dienoate
ethyl 9,10-imino-3,7,10-trimethyldodeca-2,4-dienoate
ethyl 9,10-imino-3,6,10-trimethylundeca-2,4-dienoate
ethyl 10,11-imino-7,11-dimethyldodeca-2,4-dienoate
ethyl 10,11-imino-7,11-dimethyltrideca-2,4-dienoate
ethyl 10,11-imino-11-methyl-7-ethyltrideca-2,4-dienoate
ethyl 10,11-imino-7,11-diethyltrideca-2,4-dienoate
ethyl 11,12-imino-8,12-dimethyltrideca-2,4-dienoate
ethyl 9,10-imino-7,10-dimethylundeca-2,4-dienoate
ethyl 9,10-imino-7,10-dimethyldodeca-2,4-dienoate
ethyl 9,10-imino-6,10-dimethylundeca-2,4-dienoate

EXAMPLE 7

To a mixture of 2 g. of methyl 3,7,11-trimethyl-thiol-trideca-2,4,10-trienoate in 150 ml. of methylene chloride at 0° is slowly added 1.0 molar equivalent of m-chloroperbenzoic acid in 100 ml. of methylene cholride. The resulting mixture is allowed to stand for 30 minutes at 0° and then washed with 2% aqueous sodium sulfite solution, with 5% aqueous sodium bicarbonate solution and with water, dried over sodium sulfate and evaporated to yield methyl 10,11-oxido-3,7,11-trimethyl-thioldodeca-2,4-dienoate which is purified by chromatography.

EXAMPLE 8

The process of Example 4(A) is repeated using the epoxides of Example 3 to prepare the respective halohydrins, e.g., ethyl 11-chloro-10-hydroxy-3,7,11-trimethyl-thioldodeca-2,4-dienoate,
ethyl 11-hydroxy-10-chloro-3,7,11-trimethyl-thioldodeca-2,4-dienoate,
ethyl 11-chloro-10-hydroxy-3,7,11-trimethyl-thioltrideca-2,4-dienoate,
ethyl 11-hydroxy-10-chloro-3,7,11-trimethyl-thioltrideca-2,4-dienoate, etc.

EXAMPLE 9

Following the procedure of Example 4(B), ethyl 11-chloro-10-oxo-3,7,11-trimethyl-thioldodeca-2,4-dienoate is prepared from ethyl 11-chloro-10-hydroxy-3,7,11-trimethyl-thioldodeca-2,4-dienoate. Ethyl 11-chloro-10-oxo-3,7,11-trimethylthioldodeca-2,4-dienoate is used as the starting material in the reaction sequence of Example 4, parts C, D, E and F to prepare ethyl 10,11-imino-3,7,11-trimethyl-thioldodeca-2,4-dienoate. In the same way, other 11-chloro-10-hydroxy or 11-bromo-10-hydroxy compounds of formula A such as those of Example 8 are converted into the respective aziridine (Z' taken with Z is imino) as the final product.

What is claimed is:

1. A compound of the formula

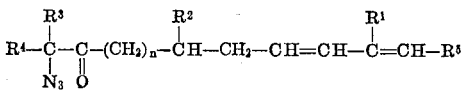

wherein, $n$ is the positive integer one or two;
each of $R^1$, $R^2$, $R^3$ and $R^4$ is methyl or ethyl; and
$R^5$ is the group

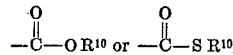

in which $R^{10}$ is lower alkyl.

2. A compound according to Claim 1 wherein each of $R^1$ and $R^3$ is methyl.

3. A compound according to Claim 1 wherein $n$ is two; and each of $R^1$, $R^2$, $R^3$ and $R^4$ is methyl.

4. A compound according to Claim 3 wherein $R^{10}$ is ethyl.

References Cited
UNITED STATES PATENTS
3,719,666   3/1973   Anderson et al. ___ 260—349 X

U.S. Cl. X.R.
424—244; 260—465.4, 465.6, 465.7, 614 R, 614 A, 614 F, 615 R, 632 R, 633, 635 R, 609 R, 583 G, 583 H, 584 A, 326.84, 326.37, 326.85, 326.2, 325.5 R, 247.2 A, 247.7 R. 247.7 A, 293.69, 293.8, 293.84, 268 H, 268 MK, 268 R